Jan. 10, 1928.
W. R. SPAULDING ET AL
1,655,667
DETACHABLE AWNING FOR CLOSED BODY AUTOMOBILES
Filed July 24, 1926
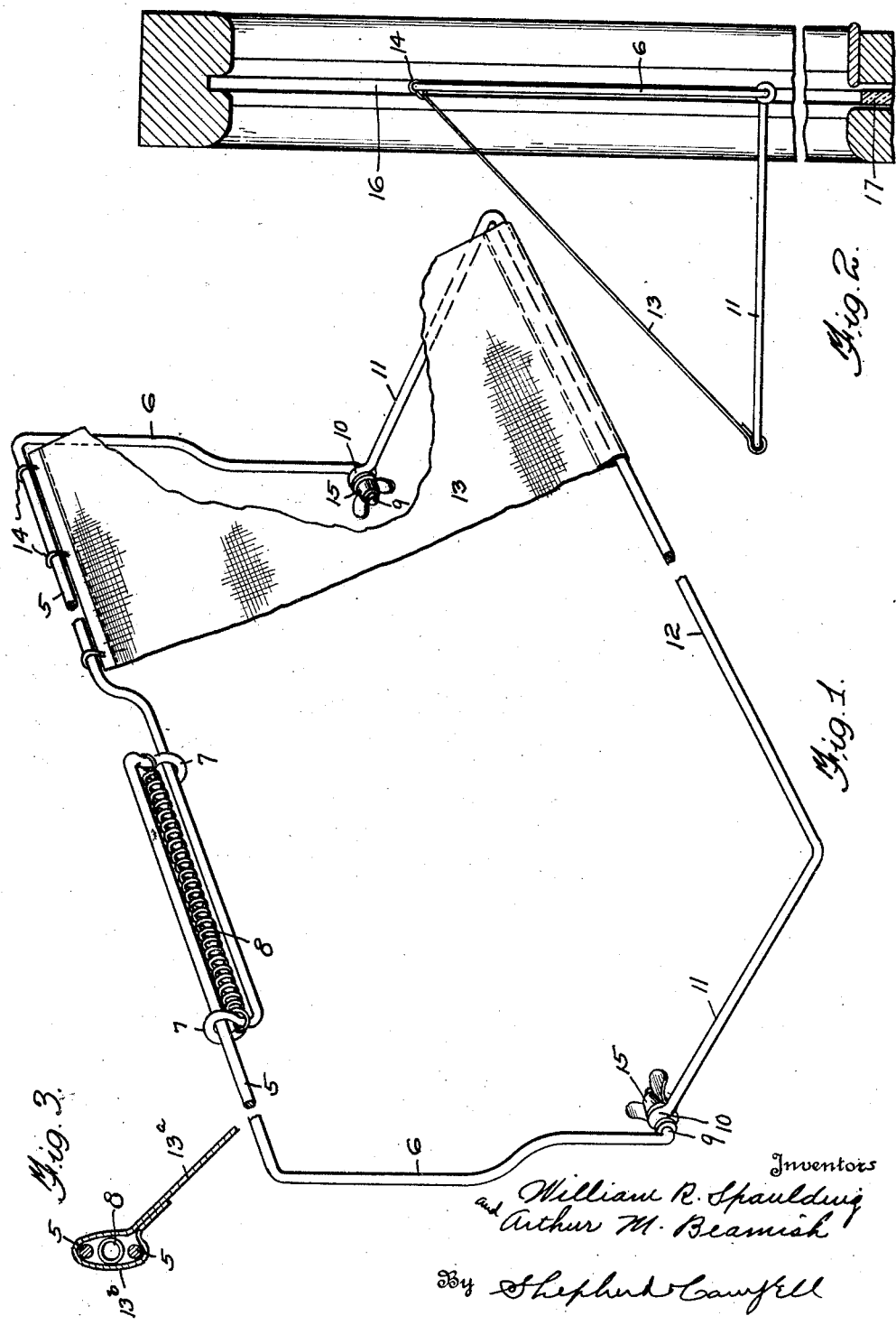

Patented Jan. 10, 1928.

1,655,667

UNITED STATES PATENT OFFICE.

WILLIAM R. SPAULDING AND ARTHUR M. BEAMISH, OF INDEPENDENCE, KANSAS.

DETACHABLE AWNING FOR CLOSED-BODY AUTOMOBILES.

Application filed July 24, 1926. Serial No. 124,621.

This invention relates to a detachable awning for automobiles and it has for its object to provide a structure adapted to be engaged in the usual glass grooves of the automobile and to be supported wholly by friction at a side of the automobile so that the occupants thereof may be shielded from the rays of the sun or from rain but without the necessity of securing supporting brackets to the automobile structure.

It is the primary object of the present invention to greatly reduce the cost of manufacture of articles intended for the general purpose set forth and with that end in view, we have produced a structure comprising merely two slidably engaged members the outer portions of which are provided with elongated bearing members, a spring tending to separate said bearing members and a spreader for an awning web hingedly connected to the lower ends of the downwardly extended bearing members, the arrangement being such that when the two frame members are pressed inwardly they may be brought into alignment with the glass grooves of an automobile door after the glass of the latter has been lowered, and when released will spring apart to be frictionally engaged in said glass grooves.

Automobile awnings adapted to be engaged in the glass grooves of an automobile door are not new, such a structure being illustrated in the patent to W. R. Spaulding, Patent No. 1,595,887, issued on the tenth day of August, 1926. However, as far as we are aware we are the first to devise a structure comprising merely the two directly engaged slidably connected frame members, the ends of which are adapted to engage in the glass grooves as described.

In the accompanying drawing

Fig. 1 is a perspective view of an awning frame constructed in accordance with the invention with a part of an awning web shown thereon.

Fig. 2 is a vertical sectional view illustrating the device in place and

Fig. 3 is a fragmentary sectional view illustrating a modified way of attaching the web to the frame at the upper edge of the web.

Like the numerals designate corresponding parts in all of the figures of the drawing.

In carrying out the invention we provide two substantially identical frame members each of which comprises a horizontal run 5, and a vertical run 6. The horizontal runs 5 terminate in eyes 7, which embrace the companion frame members so that the two horizontal runs are slidably engaged with each other. A tension spring 8 is connected at its opposite ends to the eyes 7, and tends to draw these eyes toward each other which has the effect of tending to thrust the vertical runs 6, outwardly or away from each other. The lower ends of the vertical runs 6 are inturned as at 9, to provide pivot points for eyes 10, which are formed upon the terminal ends of the legs 11 of a spreader 12. An awning web 13 is attached at its lower edge to the spreader 12 and at its upper edge to the horizontal runs of the frame members. In Fig. 1, I have illustrated the upper edge of the awning as being secured by eyelets or equivalent devices 14, to the horizontal runs while in the modified form, Fig. 3, I have illustrated the upper edge of the awning web 13$^a$ as being provided with an enlarged hem 13$^b$ which completely embraces the upper horizontal runs and spring 8. The eyes 10 are held in place and the awning web is bound in distended or open position by the tightening of thumb nuts 15, which are threaded upon the inturned ends 9 of the vertical run 6.

The upper portions of the vertical runs constitute elongated bearing members adapted to be engaged in the glass grooves of an automobile door as illustrated in Fig. 2, said glass grooves being indicated at 16 and the glass of the door being indicated in lowered position at 17. After putting the awning in place the two frame members are pressed together against the tension of spring 8 until the vertical runs 6 may be aligned with the glass grooves. When the structure is released the spring acts to thrust these vertical members apart and to cause them to engage in the glass grooves where they are securely frictionally held without undesirable rattling. By swinging the spreader downwardly until the awning web is drawn tight and then tightening the thumb nuts 16, the awning will be securely held in its lowered or distended position.

It is to be understood that the invention is not limited to the precise construction set forth but that it includes within its purview whatever changes fairly come within either the terms or the spirit of the appended claims.

Having described our invention what we claim is:

1. A device of the character described adapted to engage in the glass grooves of an automobile door comprising a pair of horizontal frame members which are slidably and directly engaged with each other and which comprise vertically elongated bearing portions shaped and dimensioned to enter said glass grooves and an awning web, the upper edge of which is complementally engaged by said horizontal frame members.

2. A device of the character described adapted to engage in the glass grooves of an automobile door comprising a pair of horizontal frame members which are slidably and directly engaged with each other and which comprise vertically elongated bearing portions shaped and dimensioned to enter said glass grooves, a spreader means at the lower ends of said frame members to which the legs of the spreader are connected and an awning web, the upper edge of which is complementally engaged by said horizontal frame members and the lower edge of which is engaged with said spreader.

3. A structure as recited in claim 1 in combination with spring means tending to thrust said members apart.

4. A structure as recited in claim 1 in combination with a tension spring tending to move said members apart.

5. A device of the character described adapted to engage in the glass grooves of an automobile door comprising a pair of horizontal frame members which are slidably and directly engaged with each other and which comprise vertical bearing portions shaped and dimensioned to enter said glass grooves, said vertical portions being downwardly extended beyond said bearing portions and terminating in inturned ends, a spreader, means for hingedly connecting said spreader with said inturned ends, means for binding said spreader against movement with respect to said inturned ends and an awning web, the upper edge of which is complementally engaged by said horizontal frame members and the lower edge of which is engaged with said spreader.

6. A structure of the character described comprising a two part frame, each of said parts comprising a horizontal portion and a vertical portion and each of said horizontal portions comprising an element which slidably engages the horizontal portion of the other member, a tension spring extending between and attached to said sliding parts, said vertical members terminating in inturned ends, a spreader having eyes engaged with said inturned ends and binding members threaded upon said inturned ends, said vertical members of the frames comprising vertically elongated bearing portions which are shaped and dimensioned to enter the glass grooves of an automobile door when the frame members are thrust apart by the action of the tension spring.

7. An automobile awning comprising a frame made of a pair of members, each of which is formed of a single piece of wire bent to form a horizontal run and a vertical run, the inner end portions of said horizontal runs being disposed in overlapping relation and each of said runs terminating in a right angular eye which embraces the horizontal run of the companion member, said vertical runs being downwardly elongated and being shaped and dimensioned to fit snugly in the glass grooves of an automobile, and a tension spring extending between and secured to said eyes and acting to thrust the vertical runs outwardly and an awning web, the upper edge of which is complementally supported by the said horizontal runs.

8. An awning frame comprising a supporting bail and a bracing bail, the said two bails having their arms pivotally connected with each other, said supporting bail consisting of two parts, each of said two parts being provided with a looped portion encircling the other of said parts whereby said two parts are slidably interconnected, and a resilient member acting between the looped portions of said two parts to yieldably hold said two parts in spread-apart relation whereby said supporting bail may be seated in the grooves of a window opening.

9. In an awning frame, two rods having horizontal slidably connected end portions and downwardly projecting end portions, the latter being adapted for engagement with window-guiding grooves, the lower ends of said vertical portions being bent inwardly toward each other and provided with shoulders, a U-shaped rod having eyes at its ends through which said inwardly bent ends pass, and nuts threaded on said inwardly bent ends to frictionally hold said eyes against said shoulders.

In testimony whereof we affix our signatures.

WM. R. SPAULDING.
ARTHUR M. BEAMISH